A. J. Gove,
Dredger,
Nº 46,463.
Patented Feb. 21, 1865.

Witnesses:
Inventor:

UNITED STATES PATENT OFFICE.

ANDREW J. GOVE, OF SAN FRANCISCO, CALIFORNIA.

IMPROVED DREDGING-MACHINE FOR HARBORS AND RIVERS.

Specification forming part of Letters Patent No. 46,463, dated February 21, 1865.

*To all whom it may concern:*

Be it known that I, ANDREW J. GOVE, of the city and county of San Francisco, State of California, have invented a new and useful Machine for Dredging Harbors, Rivers, &c.; and I do hereby declare that the following is a full and exact description thereof, reference being had to the accompanying drawings, and to the letters of reference marked thereon.

My invention consists of a scow furnished with a scoop so arranged as to be used as a dredger, and also a vehicle for conveying the material to a proper place for dumping.

Figure 1:
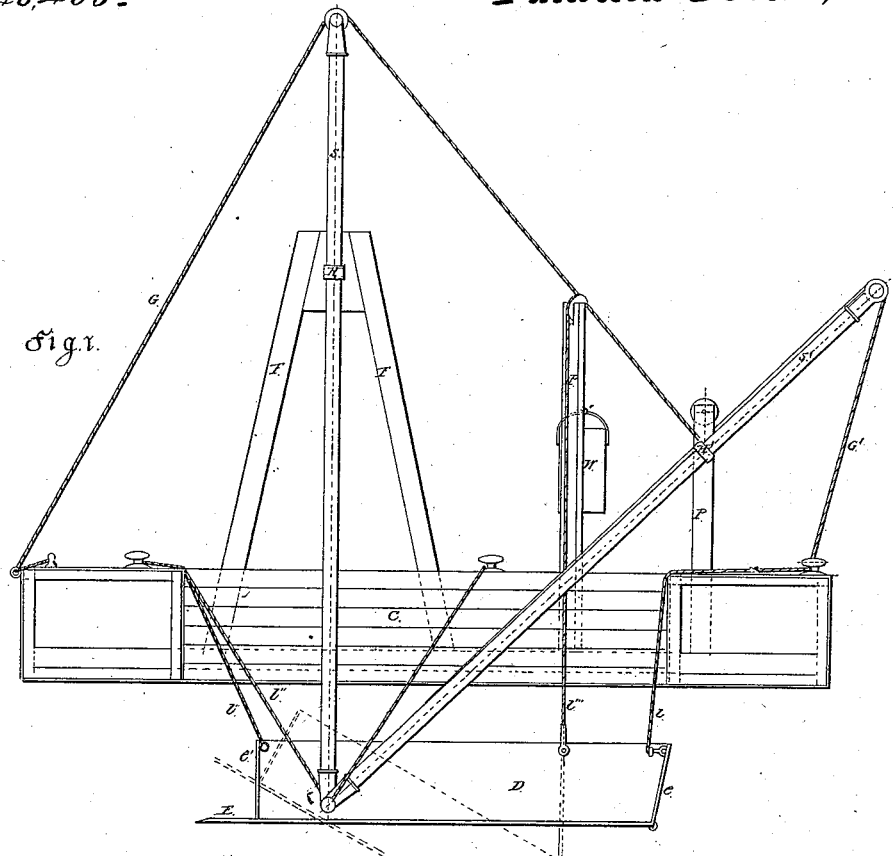
Figure 2:
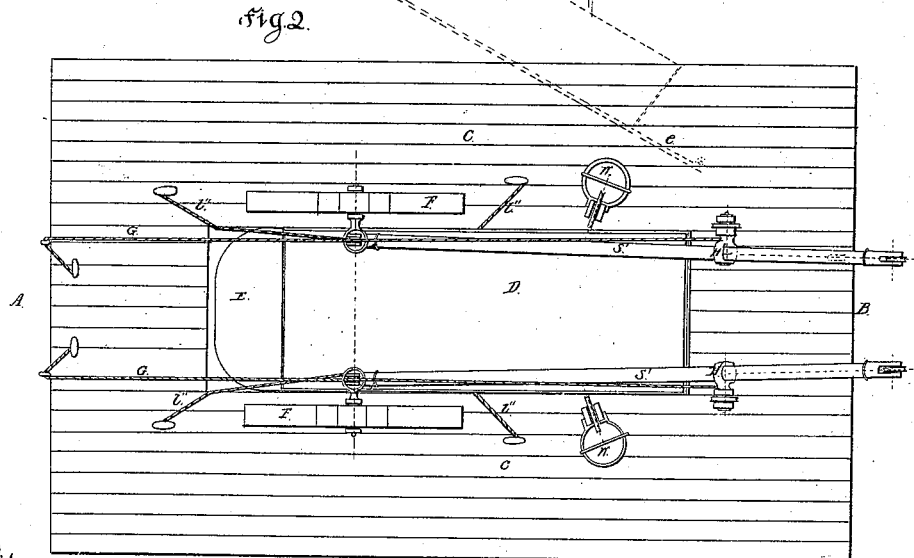

Figure 1 is a vertical sectional view through line A B, shown in Fig. 2. Fig. 2 is a plan of the machine.

C is a scow with a well in the center, as shown more particularly in Fig. 2. D is the dredger or scoop with a sharp shovel-edge, E.

$e\ e'$ are hinged ends or gates otherwise attached to the scoop. $l\ l'\ l''\ l'''$, are lanyards. F is a gallows frame. P P are posts. S S' are spars attached to the sides or bottom of scoop D. G G' are guys. W W are compensating-weights. H H' are guides for spars S S'.

Operation: The mode of operating this machine is as follows: Set the dredger or scoop D at the required depth, by means of lanyards $l\ l''$ and the spars or braces S S', which latter are held in place by the guys G G'. The rear gate, $e$, being closed and the forward gate opened or raised, the scow being propelled by power attached to itself or by tug-boat, the scoop is thrust into the bank or mud until it is filled. The front gate, $e'$, is then closed and the scow backed into deep water. The after end of the scoop is lowered, as shown by dotted lines, Fig. 1, and the rear gate opened to let the contents out. When discharged, the compensating-weights will bring the scoop back to its former position, ready to be filled again. In case of necessity, the scoop may be hoisted into the well of the scow.

I do not confine myself to the peculiar shape of the scoop; but

What I claim as my invention, and for which I desire Letters Patent to issue, is—

The scoop or dredge, D, in combination with the scow C or other convenient vessel, the spars or braces S S', the various lanyards and guys, and the compensating-weights W W, substantially as described, and for the uses and purposes as hereinbefore set forth.

ANDREW J. GOVE.

Witnesses:
CHAS. R. BOND.
ISAAC T. MILLIKEN.